US006930461B2

(12) United States Patent
Rutkowski

(10) Patent No.: US 6,930,461 B2
(45) Date of Patent: Aug. 16, 2005

(54) DEVICE AND METHOD FOR CONTROLLING A MACHINE TOOL

(75) Inventor: Christian Rutkowski, Traunstein (DE)

(73) Assignee: Dr. Johnannes Heidenhain GmbH, Traunreut (DE)

( * ) Notice: Subject to any disclaimer, the term of this patent is extended or adjusted under 35 U.S.C. 154(b) by 313 days.

(21) Appl. No.: 10/088,036

(22) PCT Filed: Jun. 27, 2001

(86) PCT No.: PCT/EP01/07319

§ 371 (c)(1),
(2), (4) Date: Aug. 14, 2002

(87) PCT Pub. No.: WO02/06907

PCT Pub. Date: Jan. 24, 2002

(65) Prior Publication Data

US 2003/0040832 A1 Feb. 27, 2003

(30) Foreign Application Priority Data

Jul. 13, 2000 (DE) .................................. 100 34 079

(51) Int. Cl.⁷ .............................................. G05B 19/10
(52) U.S. Cl. ...................... 318/567; 700/159; 700/160; 700/175
(58) Field of Search .................. 318/567; 700/159, 700/160, 175

(56) References Cited

U.S. PATENT DOCUMENTS

| | | | | |
|---|---|---|---|---|
| 4,118,776 A | * | 10/1978 | Isomura ...................... 700/181 |
| 4,135,238 A | * | 1/1979 | Hamill et al. ................ 700/180 |
| 4,484,286 A | * | 11/1984 | Nagamine et al. ........... 700/181 |
| 4,530,046 A | * | 7/1985 | Munekata et al. ............. 700/86 |
| 4,547,854 A | * | 10/1985 | Hashimoto et al. .......... 700/183 |
| 4,608,645 A | * | 8/1986 | Niwa et al. .................. 700/176 |
| 4,636,938 A | * | 1/1987 | Broome ........................ 700/86 |
| 4,706,002 A | * | 11/1987 | Fukuyama ................ 318/568.1 |
| 4,992,948 A | * | 2/1991 | Pilland et al. ............... 700/173 |
| 5,050,088 A | | 9/1991 | Buckler et al. |
| 5,091,860 A | * | 2/1992 | Fujimoto ..................... 700/169 |
| 5,289,382 A | | 2/1994 | Goto ....................... 364/474.21 |
| 5,378,218 A | * | 1/1995 | Daimaru et al. ................ 483/9 |
| 5,533,931 A | * | 7/1996 | Imai et al. ..................... 451/11 |
| 5,734,887 A | * | 3/1998 | Kingberg et al. ............... 707/4 |
| 5,870,306 A | * | 2/1999 | Harada ........................ 700/169 |
| 5,984,503 A | * | 11/1999 | Strickland et al. ............. 700/95 |
| 6,047,225 A | | 4/2000 | Iriguchi et al. .............. 700/187 |
| 6,107,768 A | * | 8/2000 | Ouchi et al. ............... 318/568.1 |
| 6,556,886 B1 | * | 4/2003 | Riva et al. ................... 700/162 |

FOREIGN PATENT DOCUMENTS

| | | |
|---|---|---|
| DE | 40 39 132 | 6/1991 |
| DE | 198 01 541 | 7/1998 |

OTHER PUBLICATIONS

G. Happersbereger, "Aufbau Einer Werkzeugdatenbank Fur Die NC–Programmierung Im DNC–Verbund", VD1 Z, De VDI Verlag GmbH, Susseldorf, Bd. 131, Nr. 9, Sep. 1, 1989, pp. 49–43.

A. Saar et al., "Rationalisierung Durch Einsatz von Werkzeug–Datenbanken", Werkstatt Und Betrieb, De, Carl Hanser Verlag, Munchen, BD. 121, Nr. 3, Mar. 1, 1998, pp. 246–248.

* cited by examiner

*Primary Examiner*—Rita Leykin
(74) *Attorney, Agent, or Firm*—Kenyon & Kenyon

(57) ABSTRACT

A device and a method are provided for controlling a machine tool, at least one arbitrarily organized database having supplementary data being used for workpiece machining. During the execution of a machining program using a processing unit, the database commands are processed by an interpreter unit in the processing unit such that the required data are retrieved from the database and are further processed in the machining program.

16 Claims, 2 Drawing Sheets

DEVICE AND METHOD FOR CONTROLLING A MACHINE TOOL

FIELD OF THE INVENTION

The present invention is directed to a device and a method for controlling a machine tool.

RELATED TECHNOLOGY

In order to machine workpieces on a numerically controlled machine tool, supplementary data are sometimes needed. Such data are stored in tabular form in data files outside of the actual machining program, i.e., NC program. The supplementary data can include, for example, geometrical tool data and compensation values for the tool geometry obtained from a workpiece measurement. Typically, the structure or organization of such supplementary data in a data file is dependent upon the particular machining technology and sometimes even upon the particular machine tool type. Accordingly, there is a great variety in the types and structures of such supplementary data in the corresponding data files.

When a particular machining program is executed, the need can arise for a specific machining task to access the supplementary data from the machining program. For example, it can become necessary to input tool compensation data in order to properly correct the tool radius on the basis of the input data. This, in turn, requires that the structure of the extracted supplementary data, i.e., the specific organization of the database in question already be known at the time the control software is created, and not first at the time the machining program is created. This means that the control manufacturer must know and take into consideration the database structures in question at the time the control software is created. Thus, for example, at this point in time, one must already know in which line and/or column, i.e., cell, of such a database, specific supplementary data are to be found. Then, it is no longer possible, later on, to use a data file having a supplementary-data structure, i.e., supplementary-data organization that deviates from the originally considered structure. Accordingly, the control software created in this manner is not to be utilized independently of a specific machining technology or independently of a special machine tool type.

SUMMARY OF THE INVENTION

The object of the present invention is, therefore, to provide a device, as well as a method for controlling a machine tool, which will enable supplementary data, which are organized in any way at all, to be flexibly utilized from a machining program, without the specific organization or structure of the supplementary data required to be known at the time the control software is created.

This objective is achieved by providing a device that includes:
  at least one database having supplementary data that are required for workpiece processing, the database being arbitrarily organized; and
  a processing unit, comprising the following functional units:
    an input interface for a machining program, the interface designed for controlling the machine tool during workpiece processing, the machining program further including database access commands;
    a database interface to the database;
    an interpreter unit that processes the database access commands in the machining program so that additionally required supplementary data are retrievable from the database; and
    a conversion unit that uses the supplementary data retrieved from the database in the further course of the machining to execute the machining program.

In addition, the above-specified objective is achieved by a method including:
  accessing at least one arbitrarily organized database having supplementary data for the workpiece machining;
  using a processing unit during the execution of a machining program; and
  processing database access commands with an interpreter unit in the machining program so that additionally required supplementary data are retrieved from the database for further workpiece machining.

The measures according to the present invention ensure that, from a machining program, supplementary data may be extracted from a database, without the specific type and structure of the database and the supplementary data stored therein having to be known already at the time the control software is created. Knowledge of the database in question and of its specific organization is not needed until the actual machining program is created at the particular machine. This ensures that the control software, which is created at one time, may be utilized for the most diversified machining technologies and/or the most diversified machine tool types, which work in conjunction with supplementary data organized in various ways.

In one especially advantageous specific embodiment of the present invention, in the particular machining program, to retrieve supplementary data from a database of this kind, database access commands are used which are based on the SQL database language or on another standardized database language.

With respect to the particular database in which the supplementary data are stored, very diverse specific embodiments exist. These may be stored, for instance, spatially separated from the particular machine or from the particular machining program; they may just as well be stored locally with the machining program, etc.

BRIEF DESCRIPTION OF THE DRAWINGS

Further advantages of the present invention and details pertaining thereto are derived from the following description of the attached drawing, whose figures show.

DETAILED DESCRIPTION OF THE DRAWINGS

Figure 1:
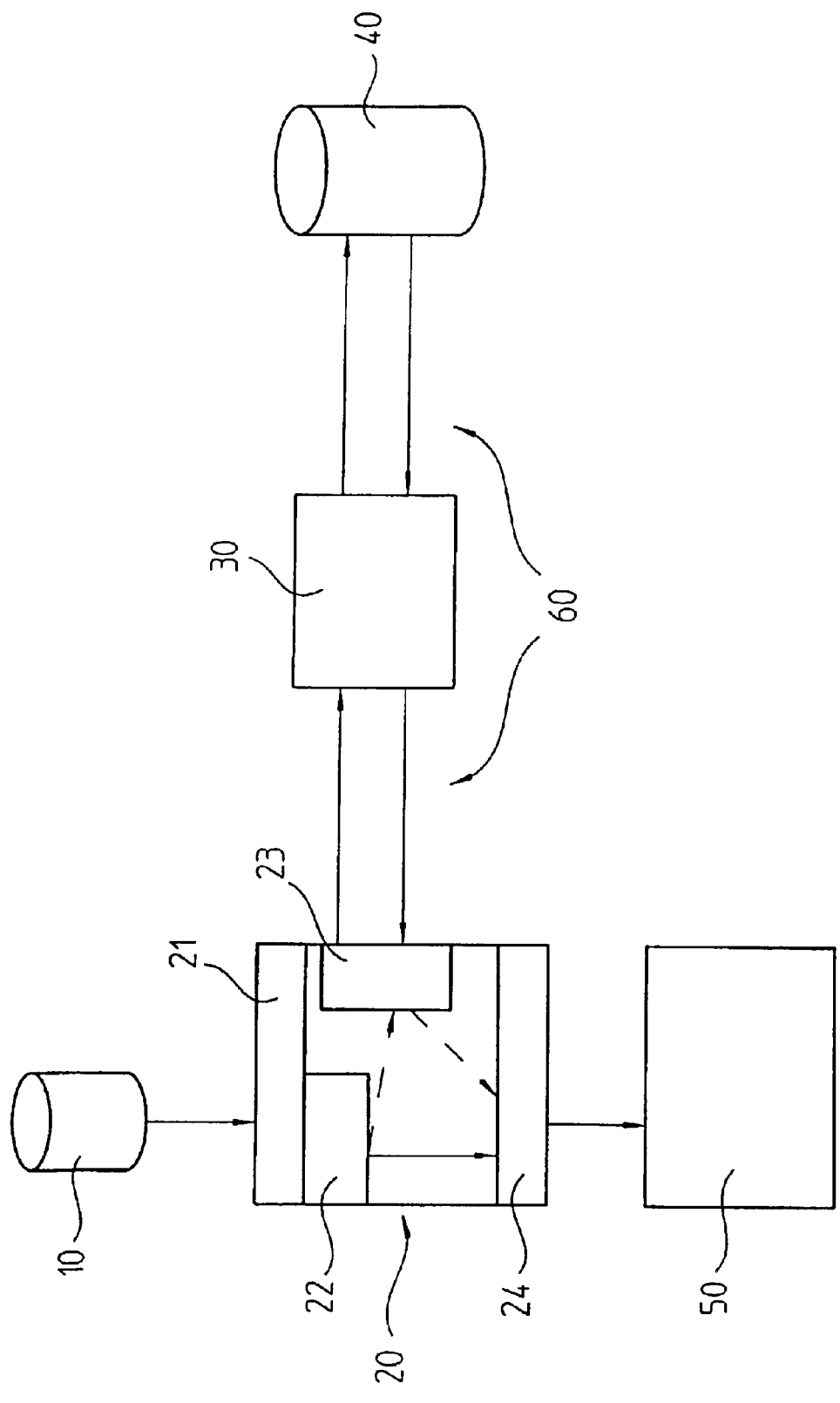
FIG. 1 illustrates a schematized block diagram illustration of an exemplary embodiment of the device according to the present invention.

On the basis of FIGS. 1 and 2, the device of the present invention, as well as the method of the present invention are elucidated in the following. In a very schematized form, FIG. 1 shows one possible specific embodiment of the device according to the present invention that is suited for numerically controlling a machine tool. The device according to the present invention essentially includes a processing unit 20 having various functional units, as well as a database 40. The functions of the various components are explained in greater detail in the following description.

In the present example, database 40 is configured so as to be spatially separate from processing unit 20 and is linked to the same via a communications channel 60, via which data are exchanged between processing unit 20 and database 40. Communications channel 60 may be implemented in a variety of ways, for instance in the form of a network or bus connection, or also as an Internet connection, etc. Alternatively, database 40 may also be fundamentally located in the immediate vicinity of processing unit 20.

As explained at the outset, supplementary data required for workpiece processing are stored in database 40. These may be very diversified types of supplementary data, such as the already mentioned tool compensation data, other supplementary data pertaining to tool geometry, and/or supplementary data pertaining to a specific machine tool type.

What is important, at this point, for the present invention is that the supplementary data, i.e., database 40, are able to be organized in any manner at all, i.e., particularly when creating the control software, the knowledge of the specific line-by-line or tabular organization of database 40 is not necessary. At this point in time, it is merely necessary then to know the logical structure of database 40 in question, i.e., which type of data are to be ultimately extracted from the database. Accordingly, the database in question may be configured both as a database that is organized in tabular form, as well as a commercially available database system. It is possible at this point, for instance, to use database 40 of a tool manufacturer in which this manufacturer has stored specific correction data. Within the course of the workpiece machining, the supplementary data are needed to allow for a tool compensation on the program side.

Besides the database's logical structure, to create the control software, one merely needs to know the protocol in communications channel 60 via which the data transfer with database 40 is handled.

Similarly to communications channel 60, database 40 in question may have many different physical designs. This means that basically all standard storage media, such as hard disk drives, CD ROMS, etc., are available for database 40. Furthermore, the database may be made up of one or of a plurality of tables having corresponding line and column structures.

In FIG. 1, reference numeral 10 denotes the machining program, i.e., the particular NC program executed by processing unit 20 in the course of the workpiece machining. It is provided in accordance with the present invention that, besides the usual machining instructions in the form of NC record instructions, machining program 10 also includes database access commands. In this connection, using database access commands, inter alia from machining program 10, supplementary data in database 40 may be selectively accessed, should this be necessary in the course of the workpiece machining. In addition, by way of the database access commands in machining program 10, the supplementary data extracted at any one time are assigned to a variable of machining program 10. Alternatively, in this manner the supplementary data extracted at any one time may be assigned to internal variables of the control software. In all cases, by way of this type of assignment, one may selectively influence the function of machining program 10 at this point.

To ensure access to the supplementary data of arbitrarily organized database 40, specific measures in accordance with the present invention are needed on the part of processing unit 20, as explained in the following. To access supplementary data from machining program 10, at this point, in conjunction with the database access commands, explicit knowledge of the specific database organization is no longer needed. It is, rather, commands from a standardized database language, such as SQL, which are used as database access commands in machining program 10. They make it possible to read out data from a database without having to know the specific structure of the table.

For processing of machining program 10, processing unit 20 has an input interface 21 for machining program 10. Configured downstream from input interface 21 is an interpreter unit 22, on the side of the processing unit. Besides executing the usual NC records in machining program 10, interpreter unit 22 also undertakes the correct processing of the database access commands, which are likewise contained in machining program 10. Thus, the database access commands are identified as such by interpreter unit 22, and, for example, the retrieval of supplementary data from database 40 via a database interface 23 in processing unit 20 is organized by interpreter unit 22. Supplementary data retrieved in this manner are subsequently fed to a conversion unit 24, which uses the supplementary data in the further course of the machining to execute machining program 10.

The above-explained functional units of processing unit 20, such as the various interfaces 21, 23, as well as interpreter unit 22, and conversion unit 24, are usually designed as software.

Illustrated downstream from processing unit 20 is merely block 50, which is intended to represent the machine tool that is controlled by the unit.

Besides the components discussed so far, FIG. 1 schematically shows a database management unit 30 that is linked via communications channel 60. The data exchange between processing unit 20 and database 40 is organized via database management unit 30. In concrete terms, this means that database management unit 30 is addressed via the standardized database access commands, and, in accordance with the database access commands, the requested supplementary data are extracted from database 40. The supplementary data, extracted in this manner, are then made available by database management unit 30 to processing unit 20, respectively to conversion unit 24, for further processing.

In addition to the elucidated read access to the data of database 40, a write access to database 40 is, of course, also possible. Thus, for example, a tool may be measured and the thereby generated data written as new compensation data into a corresponding database. A write access of this kind to database 40 is also organized via database management unit 30.

In one possible specific embodiment, database management unit 30 is designed, for instance, as an SQL server.

Figure 2:
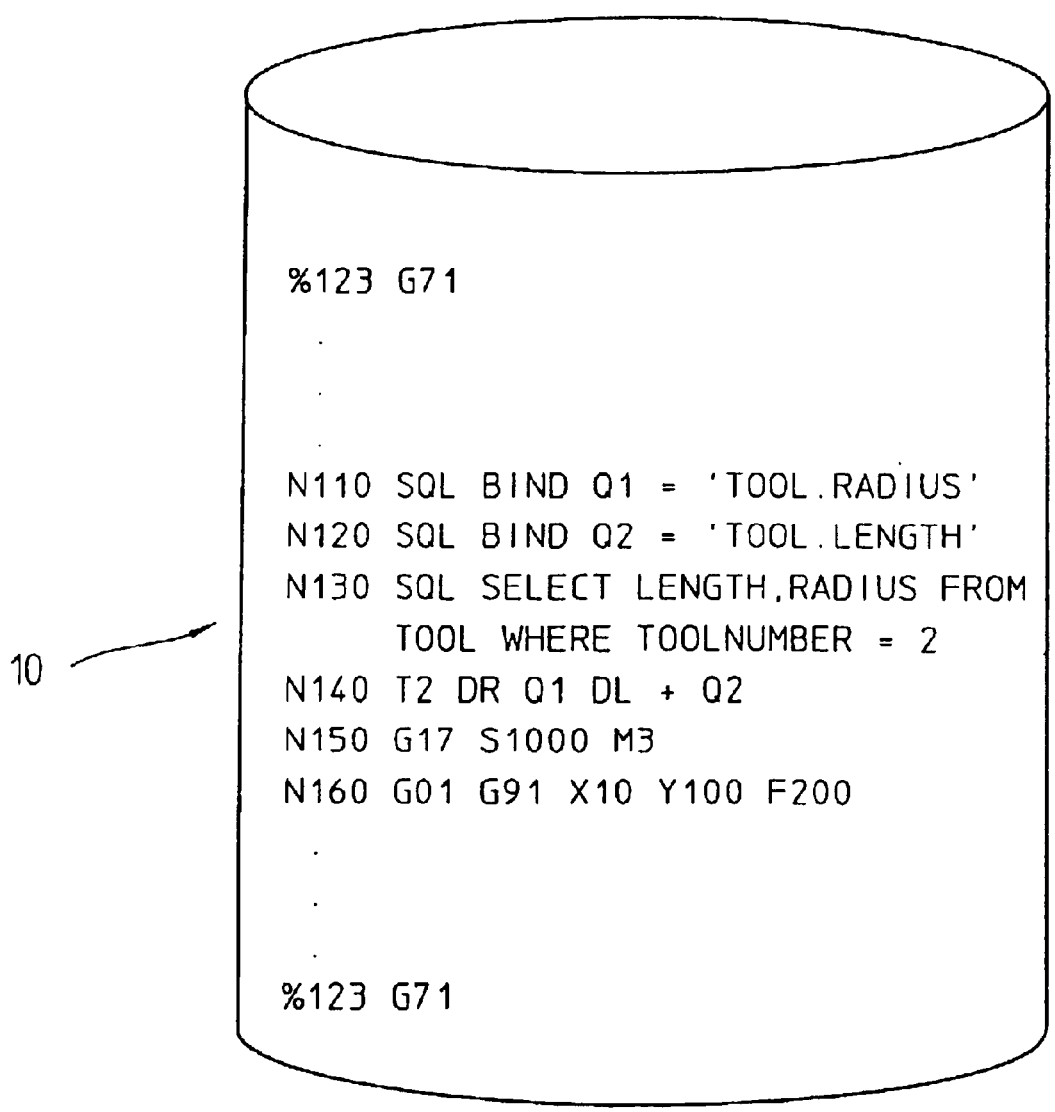
FIG. 2 illustrates an extract from a machining program that includes commands for inputting supplementary data.

FIG. 2 shows an example of one part of a machining program 10, which, between program lines N110 and N160, includes, in particular, a plurality of database access commands, via which supplementary data are extracted from a database, to be made available for further processing.

In both program lines N110 and N120, data from database TOOL to be queried are assigned to variables Q1, Q2 of machining program 10. Thus, via program line N110, a value from database column "radius" is linked to variable Q1; via program line N120, a value from database column "length" is linked to variable Q2.

Via the following program line N130, values for length and radius of tool type no. 2 are read out of database TOOL.

Finally, via program line N140, the exchange of tool no. 2 is initiated, and the allowances Q1 for the radius and Q2 for the length read out of the database TOOL are considered.

Machining program 10 is selected in the usual manner via subsequent program lines N150.

Analogously to this example, data from databases organized in any way whatsoever are accessed in the manner of the present invention.

What is claimed is:

1. A device for controlling a machine tool, the device comprising:

at least one database having supplementary data that are required for workpiece processing, the database being arbitrarily organized; and a processing unit, comprising the following functional units:

an input interface for a machining program, the interface designed for controlling the machine tool during workpiece processing, the machining program further including database access commands;

a database interface to the database;

an interpreter unit that processes the database access commands in the machining program so that additionally required supplementary data are retrievable from the database; and a conversion unit that uses the supplementary data retrieved from the database in the further course of the machining to execute the machining program.

2. The device as recited in claim 1, further comprising a database management unit that is configured to organize data exchange between the processing unit and the database, the management unit connected via a communications channel between the database and the database interface.

3. The device as recited in claim 2, wherein the database management unit is configured so that it is addressable via the database access commands on the part of the processing unit, in accordance with the database access commands, the database management unit extracts the requested supplementary data from the database, and the database management unit makes available the supplementary data to the conversion unit for further processing.

4. The device as recited in claim 3, wherein the database management unit comprises an SQL server.

5. The device as recited in claim 2, wherein the communications channel enables a bidirectional data exchange between the database and the processing unit.

6. The device as recited in claim 1, wherein the interpreter unit comprises a software program.

7. The device as recited in claim 1, wherein the database is located so as to be spatially separated from the processing unit.

8. The device as recited in claim 1, wherein the database has a line and column structure.

9. The device as recited in claim 1, wherein the supplementary data stored in the database relate to at least one of the tool geometry and to a specific machine tool type.

10. A method for controlling a machine tool comprising:

accessing at least one arbitrarily organized database having supplementary data for the workpiece machining;

using a processing unit during the execution of a machining program; and processing database access commands with an interpreter unit in the machining program so that additionally required supplementary data are retrieved from the database for further workpiece machining.

11. The method as recited in claim 10, further comprising:

requesting and exchanging supplementary data between the processing unit and the database via a communications channel between the processing unit and the database; and using a database management unit for organizing the data exchange between the processing unit and the database, the processing unit and the database connected via the communications channel.

12. The method as recited in claim 11, further comprising:

addressing the database management unit via the database access commands on the part of the processing unit, in accordance with the database access commands;

extracting the requested supplementary data from the database via the communications unit; and making available the supplementary data in question by the communications unit to a conversion unit for further processing.

13. The method as recited in claim 12, further comprising: using an SQL server as the database management unit.

14. The method as recited in claim 10, further comprising:

basing the database access commands contained in the machining program on one of an SQL database language and another standardized database language.

15. The method as recited in claim 10, further comprising:

assigning to variables of the machining program the extracted supplementary data of the database by way of the database access commands in the machining program.

16. The method as recited in claim 10, further comprising:

parameterizing further machining tasks by using the retrieved supplementary data from the database in the course of the further workpiece machining.

* * * * *

UNITED STATES PATENT AND TRADEMARK OFFICE
CERTIFICATE OF CORRECTION

PATENT NO. : 6,930,461 B2
DATED : August 16, 2005
INVENTOR(S) : Christian Rutkowski Page 1 of 1

It is certified that error appears in the above-identified patent and that said Letters Patent is hereby corrected as shown below:

<u>Title page,</u>
Item [73], Assignee, change "Dr.Johnannes Heidenhain GmbH," to -- Dr. Johannes Heidenhain GmbH, --.

Signed and Sealed this

Twenty-fourth Day of January, 2006

JON W. DUDAS
*Director of the United States Patent and Trademark Office*